United States Patent [19]

Chip et al.

[11] Patent Number: 4,863,973
[45] Date of Patent: Sep. 5, 1989

[54] POLYMERIC PARTICLES AND THEIR PREPARATION

[75] Inventors: Gerald K. Chip, Scarborough; Alfred Rudin, Waterloo, both of Canada

[73] Assignee: Tioxide Group PLC, London, United Kingdom

[21] Appl. No.: 218,271

[22] Filed: Jul. 13, 1988

[30] Foreign Application Priority Data

Jul. 30, 1987 [GB] United Kingdom ............... 8718036

[51] Int. Cl.$^4$ ..................... C08J 9/28; C08F 265/04
[52] U.S. Cl. ........................... 521/64; 521/57; 521/134; 521/54; 525/301; 525/902; 523/201
[58] Field of Search ............ 525/301, 902; 521/64, 521/57, 54, 134; 523/201

[56] References Cited

U.S. PATENT DOCUMENTS

| | | | |
|---|---|---|---|
| 3,359,130 | 12/1967 | Goldman | 521/139 |
| 3,379,799 | 4/1968 | Goldman | 521/146 |
| 3,431,319 | 3/1969 | Baum | 521/54 |
| 4,044,176 | 8/1977 | Wolinski | 521/54 |
| 4,107,120 | 8/1978 | Plamondom et al. | 524/831 |
| 4,181,769 | 1/1980 | Plamondom et al. | 428/253 |
| 4,226,752 | 10/1980 | Ericson et al. | 525/302 |
| 4,325,856 | 4/1982 | Ishikawa et al. | 523/201 |
| 4,419,496 | 12/1983 | Henton et al. | 525/301 |
| 4,427,836 | 1/1984 | Kowalski et al. | 525/301 |
| 4,468,498 | 8/1984 | Kowalski et al. | 525/301 |
| 4,469,825 | 9/1984 | Kowalski et al. | 523/201 |
| 4,497,917 | 2/1985 | Upson et al. | 523/201 |
| 4,521,568 | 6/1985 | Mori et al. | 525/309 |
| 4,543,383 | 9/1985 | Heil et al. | 524/458 |
| 4,594,363 | 6/1986 | Blakenship et al. | 521/64 |
| 4,677,003 | 6/1987 | Redlich et al. | 427/373 |
| 4,717,750 | 1/1988 | Makati et al. | 525/902 |

FOREIGN PATENT DOCUMENTS 0031964 7/1981 European Pat. Off. .
0073529 3/1983 European Pat. Off. .
0188325 7/1986 European Pat. Off. .

*Primary Examiner*—Morton Foelak
*Attorney, Agent, or Firm*—Banner, Birch, McKie & Beckett

[57] ABSTRACT

Swollen core/sheath polymeric particles are disclosed having one or more voids in the core formed by reaction with a base such as sodium hydroxide. The sheath contains styrene or similar monomer polymerized in an amount greater than 25 mole percent and the polymer is free of acid groups. The core contains acid groups. Swelling is effected at an elevated temperature and in the absence of an organic solvent.

The swollen particles on drying in a paint or other composition have air in the voids and act then as opacifying agents.

18 Claims, No Drawings

POLYMERIC PARTICLES AND THEIR PREPARATION

This invention relates to polymeric particles and to their preparation and particularly to vesiculated particles or to particles containing voids.

According to the present invention a core/sheath polymer particle comprises a core of a polymer formed at least from one ethylenically unsaturated monomer containing acid functionality and a hard sheath substantially encapsulating said core and said sheath comprising a polymer or copolymer of a nonionic monoethylenically aromatic substituted monomer in which said polymer or copolymer contains more than 25 mole percent of said nonionic monomer and said polymer or copolymer being free of polymerisable acid groups and said particles containing at least one void resulting from reaction with a non-volatile fixed or permanent base.

According to the invention also a process for the preparation of core/sheath polymer particles comprises establishing a monomer system of at least one ethylenically unsaturated monomer with acid functionality, polymerising said system in the form of an aqueous emulsion to form core particles, establishing an aqueous dispersion of said core particles and a nonionic monoethylenically aromatic substituted monomer or mixture of monomers containing more than 25 mole percent of said nonionic monomer said nonionic monomer or mixture of monomers being free of polymerisable acid groups and effecting polymerisation of said nonionic monomer or monomer mixture to deposit on said core particles a hard sheath free of acid groups, mixing said core/sheath particles so formed with a non-volatile fixed or permanent base in the absence of organic solvent to swell said cores to generate therein one or more voids.

The present invention provides vesiculated polymer particles, or core/sheath particles with one or more voids in said core, which have a hard protective sheath free of acid groups and which have been prepared by a process employing nonvolatile fixed or permanent bases as a swelling agent and said swelling being carried out in a system free of organic solvent. Recovery of organic solvents is avoided as is the recovery of excess volatile base such as ammonia.

Surprisingly it has been found that core/sheath particles which have styrenic, or substantially styrenic shells, can be swollen in non-volatile hot aqueous permanent bases without the intervention of a solvent or other expedients. A sheath formed of an acrylic polymer with a similar glass transition temperature to a styrenic sheath is not swellable under the same conditions. This in itself is surprising, since acrylic polymers are composed of residues of ethylenically unsaturated monomers containing ester groups and it has been thought for many years that esters are subject to rapid attack by warm, alkaline aqueous media. Styrenic polymers, on the other hand, being essentially hydrocarbon in character have been believed to be inert to the effects of water and bases of all types.

The production of core/sheath particles is accomplished by sequential emulsion polymerization in aqueous media. In the preferred embodiment of this invention particles of a preformed latex or "seed" polymer dispersed in water are increased in size by polymerization of the required monomers to form one or more successive polymers onto the preformed particles. Care must be taken in the subsequent polymerization stages to ensure that the later stage polymers are deposited on the preformed particles and do not form new particles or are not embedded within the polymer particles that have been made in previous stages. The procedures described in this invention are effective in preventing the formation of "new generation" particles wherein the second or later polymerization stages result in product which is not deposited on the pre-existing particles. Measurement of the particle size distributions of the dispersed polymer at every stage of the sequential polymerization process ensures that the desired encapsulation of earlier stage particles by polymer made in later stages has indeed occurred.

Particle size distribution is conveniently and reliably measured by use of a disk centrifuge such as that described by J. D. Hildreth and D. Patterson in J. Soc. Dyers Color., 80, 474 (1960).

The core polymer may be made by aqueous emulsion copolymerization of one or more ethylenically unsaturated monomers containing a carbon-carbon double bond and a carboxylic acid group. It is preferred, but not essential, that the carbon-carbon double bond in such monomers contains a carbon atom that carries two hydrogens. Such monomers are generally more reactive in polymerizations than the corresponding acidic monomers in which both carbons of the double bond are bonded to substituents other than hydrogen. Suitable acidic monomers include acrylic acid, methacrylic acid, itaconic acid, aconitic acid, maleic acid or anhydride, fumaric acid, crotonic acid, monoesters of the dibasic acids mentioned above and the like. Methacrylic acid is the preferred acidic component in this invention. The core polymer may be produced by the polymerization of one or more such acidic monomers. In preferred embodiments, however, an acidic monomer or mixture thereof is copolymerized with one or more ethylenically unsaturated monomers that contain no ionizable groups. Examples of such ethylenically unsaturated monomers include methyl methacrylate, styrene, vinyl toluene, alphamethylstyrene, ethylene, vinyl acetate, vinyl chloride, acrylonitrile, (meth)acrylamide, various alkyl or alkenyl esters of methacrylic or acrylic acid, various alkyl esters of vinyl alcohol and the like. In general core polymers containing at least 10 percent and preferably at least 20%, by weight of acid-containing monomers are particularly useful in the present invention.

The monomer mixture used to produce the core polymer preferably includes a small amount of a difunctional or polyfunctional ethylenically unsaturated monomer, such as ethylene glycol diacrylate or dimethacrylate, allyl methacrylate or acrylate, 1,3-butanediol diacrylate or dimethacrylate, divinyl benzene, trimethylolpropane triacrylate and the like. The proportion of such di- or polyfunctional monomer may be in the range of 0.1% to about 5% by weight, based on the total monomer charged to the core.

The monomers that are used to polymerize the sheath polymer on the acidic core polymer contain a substantial fraction of nonionic monoethylenically substituted monomers in which a phenyl or other aromatic group is attached to one of the carbon atoms of the carbon-carbon double bond. Examples are styrene, alpha-methylstyrene, vinyl toluene, ring substituted derivatives of these monomers and mixtures thereof. The sheath polymer preferably also contains minor properties of monomers that serve to lower the softening point of the sheath polymer to temperatures of from 40° C. to 120° C. and preferably to temperatures of from 70° C. to 100° C.

The styrenic type monomers listed above may be regarded as "hard" monomers in this context while the comonomers that are used to lower the softening temperature of the sheath polymer could be considered "soft" monomers. The reduction of the softening temperature of the sheath polymer that is envisaged is intended to facilitate the subsequent swelling of the sheath-and-core latex particles by hot aqueous permanent base, as described below.

Specific examples of soft monomers include butyl acrylate, ethyl acrylate, isobutyl acrylate, the various ethyl hexyl acrylates, butadiene, isoprene, lauryl methacrylate and similar long chain esters of acrylic and methacrylic acids and combinations thereof. Dibutyl maleate may also be used. Butyl acrylate is preferred. A feature of the present invention is the use of an excess of hard monomer over soft monomer in the sheath polymerization.

A useful measure of the softening temperature of the sheath polymer is its glass-to-rubber transition temperature, which is denoted here as Tg. Tg may be measured by a variety of methods that are well known in the industry. Such methods are summarized in textbooks of polymer science such as "Elements of Polymer Science and Engineering", by Alfred Rudin, published by Academic Press in 1982. The Tg of a copolymer may be approximated by the equation:

$$\frac{1}{Tg} = \frac{W_a}{Tg_a} + \frac{W_b}{Tg_b}$$

where Tg is the glass-to-rubber transition temperature of the copolymer and $Tg_a$ and $Tg_b$ are the Tg values for homopolymers of monomer a and monomer b, which are present in the comonomer mixture with weight fractions of $W_a$ and $W_b$, respectively. The Tg of the sheath polymer used in this invention should be above room temperature and preferably be within the range 60° C. and 100° C.

The process of this invention is not workable if the hard sheath polymer is a homopolymer of a hard ester of methacrylic acid, such as methylmethacrylate. However, minor proportions e.g. up to 30 mole percent of such aliphatic monomers may be mixed with the aromatic hard monomers of the sheath without departing from the scope of this invention.

The hard aromatic monomer component of the sheath must be more than 25 mole percent, as described above, however. Typically the hard styrenic or other nonionic monoethylenically aromatic substituted monomers present can be up to 97 mole percent and preferably 40 to 95 mole percent. Amounts of the so-called "soft" monomers can be preferably from 2 to 60 mol percent more preferably from 2 to 35 mole percent.

In an optional, but preferred process for making the core/sheath polymers of this invention the first stage in the emulsion polymerization sequence is the production of a so-called seed latex, which provides nuclei for the subsequent growth of the core polymer. The polymer of the seed latex may contain an acidic vinyl monomer, but this is not essential for the purposes of this invention. The particle size of the seed latex is preferably less than 100 nanometers.

The acid-containing core polymer particle, whether produced in a single stage or a multiplicity of stages, usually has a particle size from 100 to 1000 nanometers and preferably between from 100 to 500 nanometers. Such measurements refer to the sizes of the latex particles in the unswollen condition.

The overall size of the unswollen core/sheath polymer latex particles usually is 150 to about 4000 nanometers and preferably between 200 and 2000 nanometers.

After swelling of the core/sheath latex particles in warm water containing a permanent base the core volume has been swollen by some 150 to 2000 percent.

The polymerization reactions involved in the present invention are initiated with initiating agents that are generally similar to those employed in conventional emulsion polymerizations. As is common to such processes, preferably water-soluble initiators are used. Examples are tert-butyl hydroperoxide, hydrogen peroxide, an alkali metal (sodium, potassium or lithium) or ammonium persulphate or a mixture of such initiator with a reducing agent to form a redox system. Examples of reducing agents include alkali metal or ammonium metabisulphites, hydrosuphites or hyposulphites, or sodium formaldehyde sulphoxylate or various metal ions, such as iron, chromium, copper and the like, that may exist in plurality of valence states. The concentration of initiator may be from 0.01 to about 2 percent by weight of the monomers used in the polymerization and an approximately similar range of reducing agent may be used, in a redox system.

The molecular weight distribution of the polymer formed in any of the polymerization steps may be controlled through use of a free radical chain transfer agent, such as a mercaptan, mercaptoethanol or carbon tetrachloride. Preferably, however, such transfer agents are not used.

Nonionic or anionic emulsifiers may be used, either alone or together. In the final latex, it is preferable that there should be present both an anionic surfactant and a non-ionic surfactant, for best polymerization of the monomer(s). The choice of mixed surfactants, along with the proper selection of initiator and polymerization temperature, facilitates the production of a stable latex and substantially complete absence of residual monomers, the presence of which would make the latex product obnoxious. Suitable anionic surfactants include sodium dodecyl benzene sulphonate and the like. Suitable nonionic surfactants include ethoxylated alkyl phenols, where the alkyl group is nonyl, octyl, decyl, or similar substances that are known in the industry.

The swelling of the core/sheath particles is effected through the use of non-volatile fixed or permanent bases. Typically the swelling is effected at an elevated temperature e.g. of from 50° C. to 120° C. more preferably from 85° C. to 100° C. using an inorganic base such as an alkali metal hydroxide, bicarbonate or other similar base. Sodium hydroxide and potassium hydroxide are eminently suitable for use as the base. If desired, the swelling can be effected under superatmospheric pressure and this is particularly important for a particle with a sheath of 100% styrene.

The swollen core/sheath particles contain voids which when the particles are in the form of an aqueous dispersion are filled with liquid water. On drying the voids should become filled with air thus conferring on the particles their opacifying properties.

The particles can be used in a wide variety of applications such as aqueous paint systems, plastic compositions and many others where opacity is an important consideration.

The invention is illustrated in the following Examples.

EXAMPLE 1

Polymerization

The emulsions were prepared in a thermostatically controlled glass reactor, fitted with a stirrer, condenser and a glass tube for purging with nitrogen. A typical sequential emulsion polymerization recipe is reproduced below.

Emulsion polymerization of seed polymer

| | |
|---|---|
| water | 433 g |
| anionic surfactant (Siponate DS-10, Alcolac Inc) | 0.3 g |
| ammonium persulphate initiator | 0.45 g |
| t-butyl hydroperoxide (70%) | 0.15 ml |
| sodium formaldehyde sulphoxylate | 0.25 g |
| water soluble base to adjust pH of seed polymer | |
| monomer emulsion | |
| water | 39.7 g |
| anionic surfactant (Siponate DS-10) | 0.06 g |
| butyl acrylate | 62 g |
| methyl methacrylate | 56 g |
| methacrylic acid | 1.55 g |

In a one liter reactor, water, surfactant, initiator and 7.5 g of the monomer emulsion were combined with stirring under a nitrogen atmosphere at 78° C. After fifteen minutes the remaining monomer emulsion was added at a rate of 1 g/min. and the reaction temperature was raised to 85° C. Fifteen minutes after monomer addition was complete, the mixture was cooled. At 55° C. the t-butyl hydroperoxide and then the sodium formaldehyde sulphoxylate dissolved in 5 ml. of water were added. The seed polymer emulsion so obtained was filtered through a 100 mesh screen to remove coagulum. Number average particle size was determined to be 94 nm.

Emulsion polymerization of core polymer

| | |
|---|---|
| water | 1060 g |
| ammonium persulphate initiator | 2.1 g |
| seed polymer emulsion (19.6% solids) | 31 g |
| monomer emulsion: | |
| water | 118 g |
| anionic surfactant (Siponate DS-10) | 0.4 g |
| methyl methacrylate | 245 g |
| methacrylic acid | 105 g |
| ethylene glycol dimethacrylate | 1.75 g |

In a two liter reactor, water, initiator and seed polymer were combined with stirring under a nitrogen atmosphere at 85° C. Monomer emulsion was added to the reactor at 2.6 g/min. and when the addition was complete, the reactor was held at 85° C. for 30 minutes. The core polymer emulsion so obtained was cooled to 25° C. and filtered through a 100 mesh screen. Number average particle size was determined to be 332 nm.

Emulsion polymerization of core/sheath polymer

| | |
|---|---|
| water | 486 g |
| ammonium persulphate initiator | 0.262 g |
| seed polymer emulsion (23% solids) | 32.9 g |
| monomer emulsion: | |
| water | 100 g |
| styrene | 123.8 g |
| butyl acrylate | 100 g |
| anionic surfactant (Siponate DS-10) | 0.5 g |
| nonionic surfactant (Igepal CO 970, GAF Corp.) | 2.0 g |

In a one liter reactor, water, initiator and core polymer were combined with stirring at 85° C. Monomer emulsion was added at 1.7 g/min. One hour after monomer addition was complete, the emulsion of core/sheath polymer particles was cooled to 25° C. and filtered through a 100 mesh screen. Number average particle size was determined to be 890 nm.

Particle size measurements were performed on an ICI-Joyce Lobel Disk Centrifuge. Centrifuge speeds were chosen so that particles passed the detector between 1 and 25 minutes after injection. The output of the optical detector was recorded on a strip chart recorder operated at 2.5 V full scale. Samples were diluted to between 0.25 and 0.5% weight concentrations with a 80% water-20% methanol mixture. The spin fluid was water or a glycerol-water mixture. The density gradient within the spin fluid was formed with methanol for a spin fluid of water and with water for a spin fluid of glycerol-water. In all cases stable sedimentation conditions were achieved.

These particles were held for one hour at 99° C. in water with pH 11.75. The medium was made alkaline with sodium hydroxide. The final diameter of the swollen particles, after cooling, was found to be 974 nanometers, indicating a diameter swelling of 11.8 percent and a volume swelling of 720 percent. The unswollen beads were treated, for comparison, for 65 minutes at 97° C. in water with pH 6.40. In this case, there was no detectable swelling of the particles.

EXAMPLE 2

In another version of the core/sheath particles discussed in Example 1, particles with identical composition were made with diameter 408 nanometers. After swelling for one hour at 95° C. in water containing sodium hydroxide, and subsequent cooling, the overall particle diameter was found to have increased to 504 nanometers.

EXAMPLE 3

In another version of the core/sheath particles discussed in Example 1, the shell polymer was poly(methyl methacrylate) free of any polymerised styrene. In this case, swelling for one hour at 95° C. resulted in a diameter increase from 328 nanometers to only 341 nanometers. Here the diameter increase was only 4 percent, compared to the 24 percent change with a styrenic shell, in Example 2.

EXAMPLE 4

In another version of the core/sheath particles discussed in Example 1, the shell polymer was a mixture of methyl methacrylate and styrene in the molar ratio of 75:25. Treatment for 1 hour at 95° C. in aqueous sodium hydroxide resulted in a diameter increase from 397 nanometers to 404 nanometers. This This slight change indicates negligible swelling.

EXAMPLE 5 TO 13

By the same general method of Example 1 further products were formed with sheaths of differing compositions.

The composition and properties of the particles obtained are given in the following Table.

TABLE

| Example | Comonomer Ratio in Sheath | Comonomers | Tg of sheath °C. | pH after swelling | Voids |
|---|---|---|---|---|---|
| 5 | 45/45/10 | STY/MMA/BA | 81.2 | 12.4 | YES |
| 6 | 94/5/1 | STY/MMA/EGM | 87 | 7.5 | YES(a) |
| 7 | 94/5/1 | STY/MMA/EGM | 87 | 7.5 | YES(b) |
| 8 | 95/5 | STY/BA | 87.0 | 7.6 | YES |
| 9 | 90/10 | STY/BA | 85.1 | 10.5 | YES |
| 10 | 80/20 | STY/BA | 69.2 | 8.7 | YES |
| 11 | 85/15 | STY/BA | 77.7 | 6.9 | YES |
| 12 | 70/30 | STY/BA | 48.2 | 7.9 | YES |
| 13 | 100 | STY | 98.2 | 11.5 | NO |

All at atmospheric pressure
The swelling agent in all cases was 20% NaOH.
(a)Temperature of swelling 99° C.; diameter swelling was 11.8% and core volume swelling was 720%.
(b)Temperature of swelling was 95° C., diameter swelling 4% and core volume swelling was 350%.
STY = styrene
BA = butyl acrylate
MMA = methyl methacrylate
EGM = ethylene glycol dimethacrylate

We claim:

1. A core/sheath polymer particle which comprises a core of a polymer formed at least from one ethylenically unsaturated monomer containing acid functionality and a hard sheath substantially encapsulating said core and said sheath comprising a polymer or a copolymer of a nonionic monoethylenically aromatic substituted monomer in which said polymer or copolymer contains more than 25 mole percent of said nonionic monomer and said polymer or copolymer being free of polymerisable acid groups and said particles containing at least one void resulting from reaction with a nonvolatile fixed or permanent base.

2. A core/sheath polymer particle according to claim 1 in which the nonionic monoethylenically aromatic substituted monomer is selected from the class consisting of styrene, alpha-methylstyrene, vinyl toluene, ring substituted derivatives of styrene, of alphamethyl styrene and of vinyl toluene and mixtures thereof.

3. A core/sheath polymer particle according to claim 1 in which the sheath polymer has a softening temperature of from 40° C. to 120° C.

4. A core/sheath polymer particle according to claim 1 in which the sheath polymer has a softening temperature of from 70° C. to 100° C.

5. A core/sheath polymer particle according to claim 1 in which the sheath is a copolymer also of a soft monomer selected from the class consisting of butyl acrylate, ethyl acrylate, isobutyl acrylate, the ethyl hexyl acrylates, butadiene, isoprene, lauryl methacrylate, the long chain esters of acrylic acid, the long chain esters of methacrylic acid, dibutyl maleate and mixtures thereof.

6. A core/sheath polymer particle according to claim 1 in which the glass transition temperature of the sheath is within the range 60° C. and 100° C.

7. A core/sheath polymer particle according to claim 1 in which the said non-ionic monoethylenically aromatic substituted monomer is up to 98 mole percent of said sheath.

8. A core/sheath polymer particle according to claim 7 in which the amount of said monomer is from 40 to 95 mole percent.

9. A core/sheath polymer particle according to claim 5 in which the amount of the said soft monomer is from 2 to 60 mole percent of said sheath.

10. A core/sheath polymer particle according to claim 9 in which the amount of the said soft monomer is from 2 to 35 mole percent.

11. A core/sheath polymer particle according to claim 1 in which said core is a copolymer of a non-ionic ethylenically unsaturated monomer and one or more monomers containing a carboxylic acid group or ester thereof.

12. A core/sheath polymer particle according to claim 1 in which the core is a copolymer of an acidic monomer selected from the class consisting of acrylic acid, methacrylic acid, itaconic acid, aconitic acid, maleic acid, maleic acid anhydride, fumaric acid and crotonic acid.

13. A core/sheath polymer particle according to claim 1 in which the core is a copolymer of an unsaturated monomer selected from the class consisting of methyl methacrylate, styrene, vinyl toluene, alpha methyl styrene, ethylene, vinyl acetate, vinyl chloride, acrylonitrile, acrylamide, methacrylamide, alkyl esters of methacrylic acid, and of arylic acid and of vinyl alcohol and alkenyl esters of methacrylic acid and of acrylic acid and of vinyl alcohol.

14. A core/sheath polymer particle according to claim 1 in which the core contains at least 10 percent by weight of a monomer containing acid functionality.

15. A core/sheath polymer particle according to claim 14 in which the core contains at least 20 percent by weight of a monomer containing acid functionality.

16. A core/sheath polymer particle according to claim 1 in which the core is a copolymer also of a difunctional or polyfunctional ethylenically unsaturated monomer.

17. A core/sheath polymer particle according to claim 16 in which the monomer is selected from the class consisting of ethylene glycol diacrylate, ethylene glycol dimethacrylate, allyl methacrylate, allyl acrylate, 1,3 butanediol diacrylate and 1,3 butanediol dimethacrylate.

18. A core/sheath polymer particle according to claim 16 in which the amount of the said monomer is from 0.1% to 5% by weight of the core.

* * * * *